(12) United States Patent
Arnold et al.

(10) Patent No.: US 8,313,136 B2
(45) Date of Patent: Nov. 20, 2012

(54) VEHICLE HAVING UTILITY BED AND LOCKING DEVICE

(75) Inventors: David W. Arnold, Glendale, CA (US); Michael Bury, Temecula, CA (US)

(73) Assignee: Honda Motor Company, Ltd., Tokyo (JP)

( * ) Notice: Subject to any disclaimer, the term of this patent is extended or adjusted under 35 U.S.C. 154(b) by 381 days.

(21) Appl. No.: 12/685,877

(22) Filed: Jan. 12, 2010

(65) Prior Publication Data

US 2011/0169289 A1   Jul. 14, 2011

(51) Int. Cl.
    *B60J 7/00*   (2006.01)
(52) U.S. Cl. ............ 296/183.2; 296/26.11; 296/24.43; 296/186.4; 296/64; 298/17 R
(58) Field of Classification Search ............... 296/26.11, 296/24.43, 183.2, 186.4, 64; 298/17 R
    See application file for complete search history.

(56) References Cited

U.S. PATENT DOCUMENTS

| | | | |
|---|---|---|---|
| 3,117,820 A | 1/1964 | Toland et al. | |
| 3,927,911 A | 12/1975 | Rosquist | |
| 4,442,915 A | 4/1984 | Steel | |
| 4,480,868 A | 11/1984 | Koto | |
| 4,519,646 A | 5/1985 | Leitermann et al. | |
| 5,934,727 A | 8/1999 | Storc et al. | |
| 5,979,964 A | 11/1999 | Ban et al. | |
| 6,059,499 A | 5/2000 | Bird | |
| 6,237,981 B1 | 5/2001 | Selleck | |
| 6,416,104 B1 | 7/2002 | Fisher et al. | |
| 6,481,772 B1 | 11/2002 | Tenn | |
| 6,557,882 B2 | 5/2003 | Harrington | |
| 6,644,709 B2 | 11/2003 | Inagaki et al. | |
| 6,752,468 B2 | 6/2004 | Eliasson | |
| D498,435 S | 11/2004 | Saito et al. | |
| 6,905,159 B1 | 6/2005 | Saito et al. | |
| 6,994,388 B2 | 2/2006 | Saito et al. | |
| 7,416,238 B2 | 8/2008 | Houston | |
| 7,510,235 B2 | 3/2009 | Kobayashi et al. | |
| 7,578,544 B1 * | 8/2009 | Shimamura et al. | ....... 296/183.2 |
| 7,735,896 B2 | 6/2010 | Kubota | |
| 8,075,040 B2 * | 12/2011 | Arnold | ........................... 296/69 |
| 2005/0264048 A1 | 12/2005 | Collins | |
| 2008/0309112 A1 | 12/2008 | Duller | |
| 2009/0072603 A1 | 3/2009 | Kobayashi et al. | |
| 2009/0256388 A1 | 10/2009 | Tanaka et al. | |

OTHER PUBLICATIONS

Black, Melissa Ann, Final Office Action, Notification Date of Jul. 21, 2011; U.S. Appl. No. 12/477,717; Titled: Vehicle Having Utility Bed and Seat; filed: Jun. 3, 2009; Inventor: David W. Arnold, in its entirety.

U.S. Appl. No. 12/208,753, Titled: Vehicle Having Utility Bed and Folding Seat Assembly, filed: Sep. 11, 2008, Inventor: Lee N. Bowers, in its entirety.

(Continued)

*Primary Examiner* — Joseph Pape
(74) *Attorney, Agent, or Firm* — Ulmer & Berne LLP

(57) ABSTRACT

A vehicle includes a vehicular frame, a utility bed, and a locking device. The utility bed is pivotally coupled with the vehicular frame and is pivotable between a hauling position and a dumping position. The locking device is operable between a locked position and an unlocked position and is configured to prevent the utility bed from pivoting to the dumping position when the locking device is in the locked position.

20 Claims, 17 Drawing Sheets

OTHER PUBLICATIONS

U.S. Appl. No. 12/477,717; Titled: Vehicle Having Utility Bed and Seat; filed: Jun. 3, 2009 Inventor: David W. Arnold, in its entirety.

U.S. Appl. No. 12/646,100; Titled: Vehicle Having Utility Bed and Passenger Restraint Assembly; filed: Dec. 23, 2009, Inventors: David W. Arnold et al., in its entirety.

Black, Melissa Ann, Final Office Action, Notification Date of Feb. 18, 2011; U.S. Appl. No. 12/208,753; Titled: Vehicle Having Utility Bed and Locking Device; filed: Sep. 11, 2008; Inventor: Lee N. Bowers, 15 pages.

Black, Melissa Ann, Non-Final Office Action, Notification Date of Feb. 3, 2011; U.S. Appl. No. 12/477,717; Titled: Vehicle Having Utility Bed and Seat; filed: Jun. 3, 2009; Inventor: David W. Arnold, in its entirety.

\* cited by examiner

VEHICLE HAVING UTILITY BED AND LOCKING DEVICE

TECHNICAL FIELD

A vehicle includes a frame and a utility bed. The utility bed is coupled with the frame. The utility bed includes a locking device that is configured to prevent the utility bed from pivoting to a dumping position.

BACKGROUND

Certain conventional vehicles include a utility bed which is movable between a hauling position and a dumping position. Such a utility bed is often referred to as a "dump bed" and is suitable to facilitate transportation of cargo.

SUMMARY

In accordance with one embodiment, a vehicle comprises a vehicular frame, a utility bed and a locking device. The utility bed is pivotally coupled with the vehicular frame and is pivotable between a hauling position and a dumping position. The utility bed comprises a bed floor and a wall. The wall is movably coupled with the bed floor and is movable between an erected position and a collapsed position. The locking device is coupled with at least one of the wall and the vehicular frame. The locking device is operable between a locked position and an unlocked position in response to movement of the wall between the erected position and the collapsed position. The locking device is configured to prevent the utility bed from pivoting to the dumping position when the locking device is in the locked position.

In accordance with yet another embodiment, a vehicle comprises a vehicular frame, a utility bed, and a locking device. The utility bed is pivotally coupled with the vehicular frame and is pivotable between a hauling position and a dumping position. The utility bed comprises a first floor portion that is pivotable between a cargo support position and an upright position. The locking device is coupled with at least one of the first floor portion and the vehicular frame. The locking device is operable between a locked position and an unlocked position in response to movement of the first floor portion between the cargo support position and the upright position. The locking device is configured to prevent the utility bed from pivoting to the dumping position when the locking device is in the locked position.

In accordance with still another embodiment, a vehicle comprises a vehicular frame, a utility bed, and a means for preventing the utility bed from pivoting to the dumping position when the wall is in the collapsed position. The utility bed is pivotally coupled with the vehicular frame and is pivotable between a hauling position and a dumping position. The utility bed comprises a bed floor and a wall. The wall is movably coupled with the bed floor and is movable between an erected position and a collapsed position.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION

Figure 1:
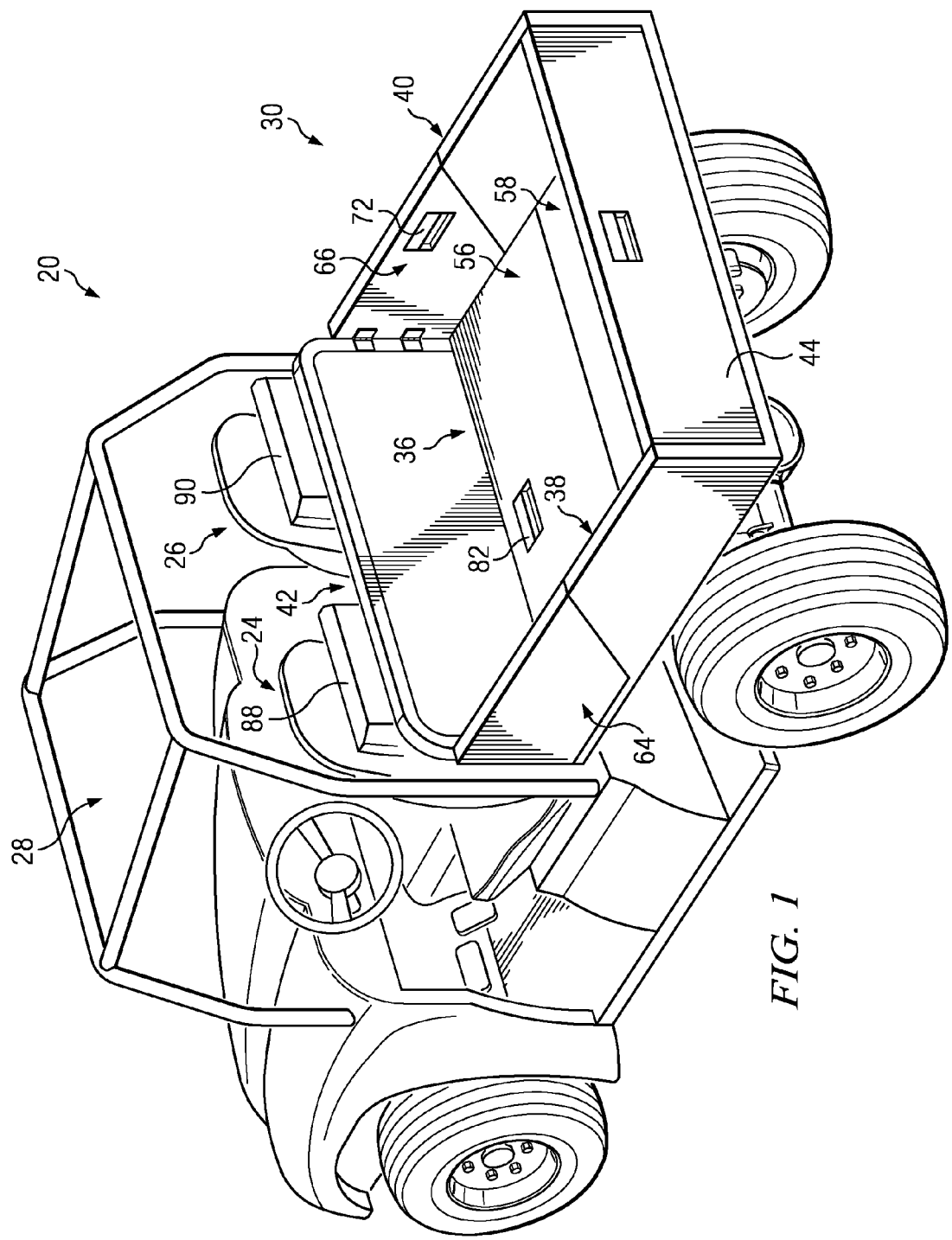
FIG. 1 is a left rear perspective view depicting a vehicle in accordance with one embodiment.

Embodiments are hereinafter described in detail in connection with the views of FIGS. 1-17, wherein like numbers indicate the same or corresponding elements throughout the views. A vehicle includes a utility bed which can be used to facilitate hauling of cargo by the vehicle. In one embodiment, the vehicle can be a dump-type vehicle having a utility bed that can facilitate selective dumping of cargo from the utility bed. A dump-type vehicle can comprise a light utility vehicle, such as the utility vehicle 20 shown in FIGS. 1-17. In other embodiments, a dump-type vehicle can comprise any of a variety of other types of vehicles having a utility bed that is capable of dumping (e.g., a dump bed) such as, for example, a pickup truck, a dump truck, an all terrain vehicle ("ATV"), and a golf cart, for example. In another embodiment, the vehicle can include a trailer.

Referring again to FIGS. 1-17, the utility vehicle 20 can include a vehicular frame 22. The vehicular frame 22 can include any of a variety of structural and/or decorative rails, panels, and/or other components which are typically, although not necessarily, formed from metal (e.g., steel and/or aluminum). A left front seat 24 and a right front seat 26 can each be supported by the vehicular frame 22 and can facilitate support of occupants within a passenger compartment 28. The utility vehicle 20 can also include a utility bed 30 which can be coupled with the vehicular frame 22, either directly or indirectly, and such as through use of a hinge assembly 32 shown in FIG. 2. The hinge assembly 32 can facilitate pivotable movement of the utility bed 30 with respect to the vehicular frame 22 of the utility vehicle 20 between a hauling position (shown in FIGS. 1 and 3) and a dumping position (shown in FIG. 2). When the utility bed 30 is in the hauling position, the utility bed 30 can rest upon a rest surface 35 (FIG. 2) provided by a rest structure 33 which is attached to the vehicular frame 22 of the utility vehicle 20. In one embodiment, the rest structure 35 can comprise a rigid structure (e.g., formed from sheet metal), though in another embodiment, a rest structure can comprise a resilient element (e.g., a rubber bumper).

Figure 2:
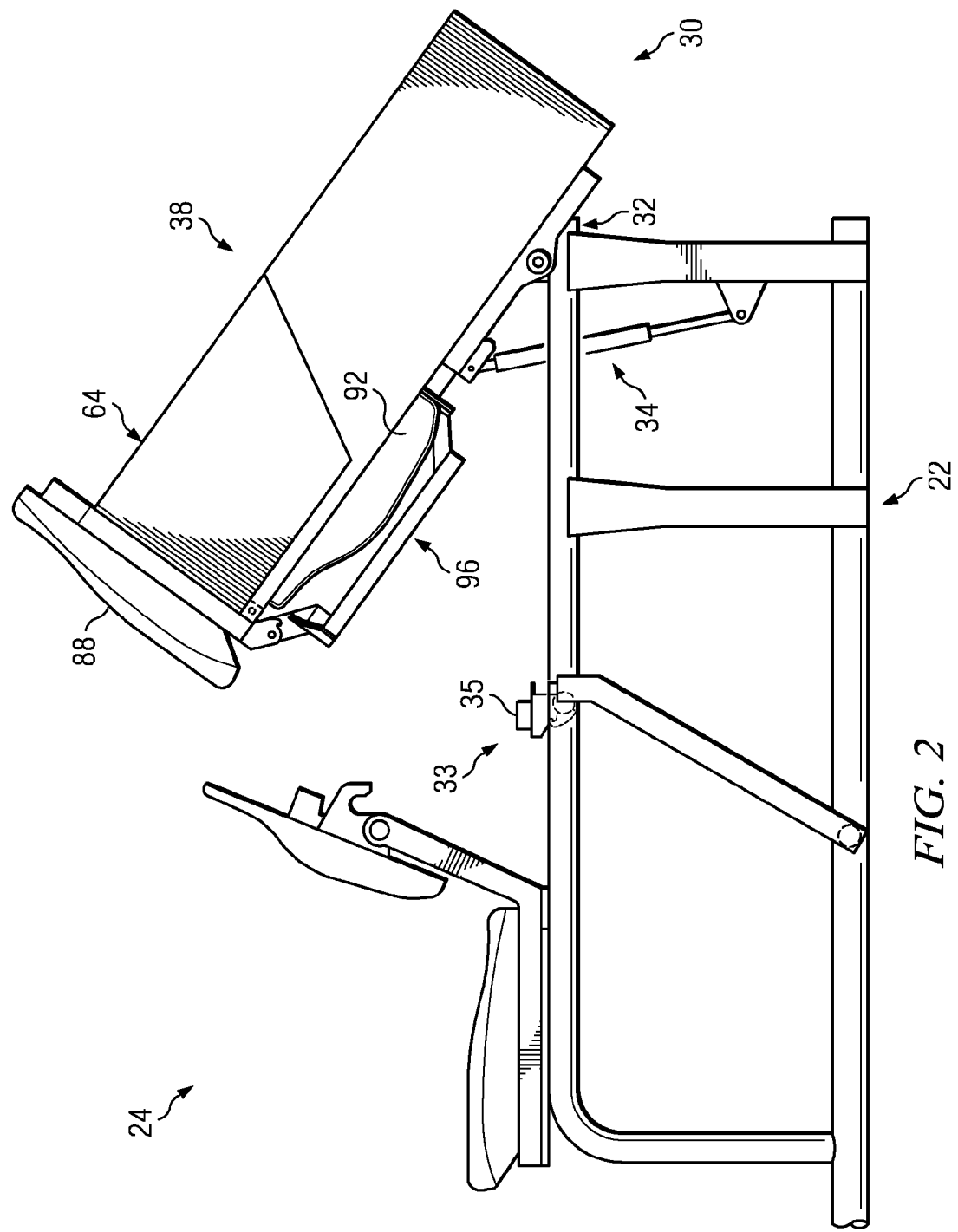
FIG. 2 is a right side elevational view depicting a utility bed and other various components of the vehicle of FIG. 1, wherein the utility bed is shown in a dumping position.

The utility vehicle 20 can include an actuator 34 coupled with the vehicular frame 22 and the utility bed 30. The actuator 34 can be configured to facilitate movement of the utility bed 30 between the hauling position and the dumping position. In one embodiment, the actuator 34 can include an electric linear actuator, as illustrated in FIG. 2. It will be appreciated that any of a variety of known conventional mechanisms or methods (none shown) can be provided to facilitate manual or powered movement of the utility bed 30 between the hauling and dumping positions under control of an operator of the utility vehicle 20.

In the embodiment of FIGS. 1-11, the utility bed 30 is shown to comprise a bed floor 36. The utility bed 30 is also shown to include a left side wall 38 and a right side wall 40 each extending generally perpendicularly from the bed floor 36 or locations adjacent to the bed floor 36. The utility bed 30 can also include end walls such as a front wall 42 and a tailgate 44, as illustrated in FIGS. 1-6. The tailgate 44 can be pivotally coupled with respect to the bed floor 36. When the utility bed 30 is in the hauling position (shown in FIGS. 1 and 3), it will be appreciated that the left side wall 38, the right side wall 40, and the front wall 42 can cooperate with the bed floor 36 to retain cargo within the utility bed 30. The tailgate 44, when closed (as shown in FIGS. 1-6), can also cooperate with the left side wall 38, the right side wall 40, and the bed floor 36 to retain cargo within the utility bed 30. It will be appreciated that the tailgate 44 can be selectively opened to facilitate loading of the utility bed 30 and/or to allow cargo (e.g., dirt) to pour from the utility bed 30 when the utility bed 30 is in a dumping position (shown in FIG. 2). In another embodiment, it will be appreciated that a rear wall can be provided in lieu of a tailgate with the rear wall being rigidly affixed with respect to a bed floor of a utility bed such that it might not be capable of being selectively opened by an operator. In yet another alternative embodiment, it will be appreciated that one or more side walls (e.g., 38 and/or 40) of a utility bed might be capable of being selectively opened (e.g., like tailgate 44) by an operator. In still another alternative embodiment, it will be appreciated that a utility bed might not include any tailgate and/or side walls and might, for example, comprise a flat-bed type configuration (e.g., commonly used for hauling small vehicles).

Figure 4:
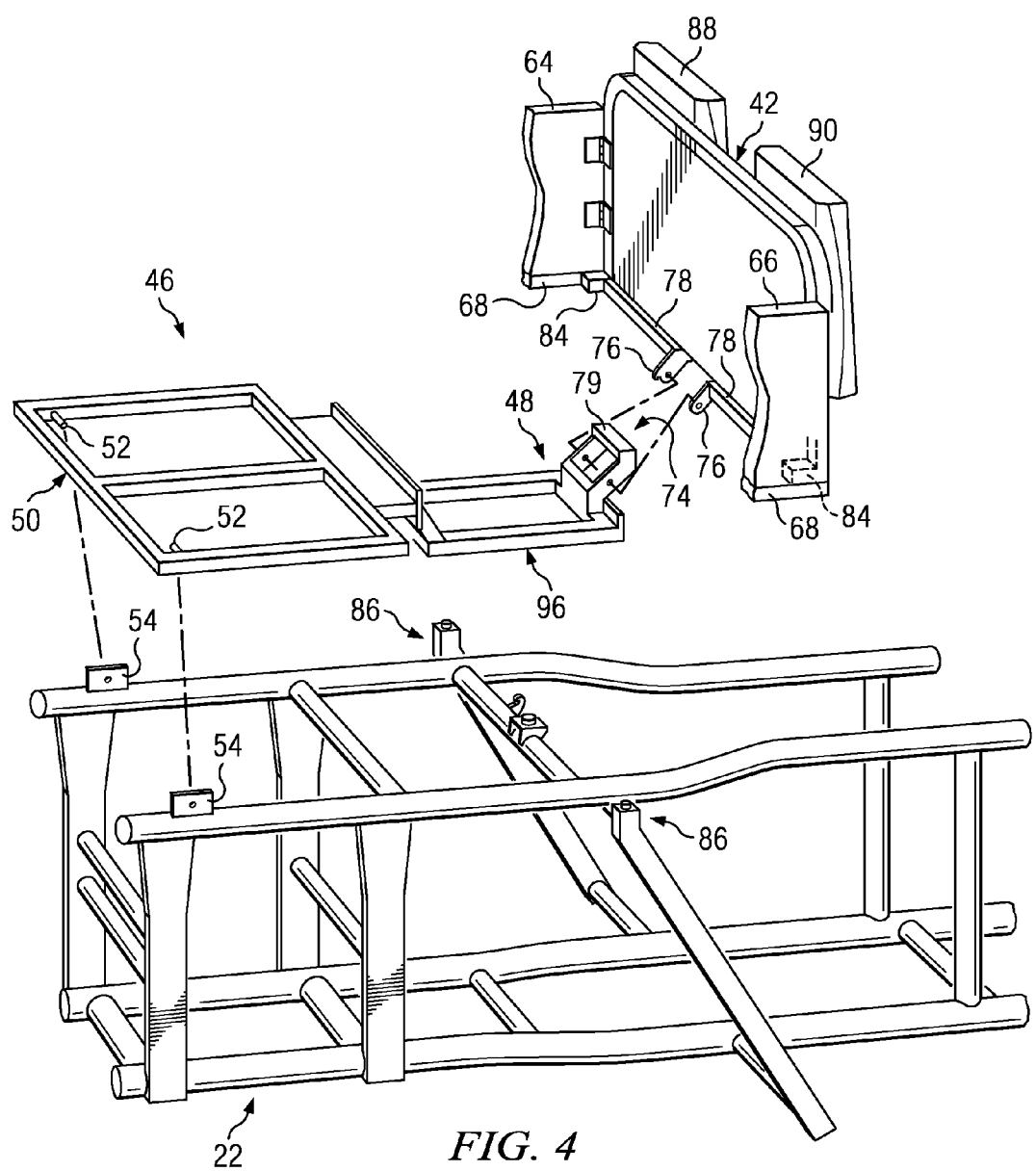
FIG. 4 is an exploded view of the front wall, a bed frame, a vehicular frame, and various other components of the vehicle of FIG. 1.
Figure 5:
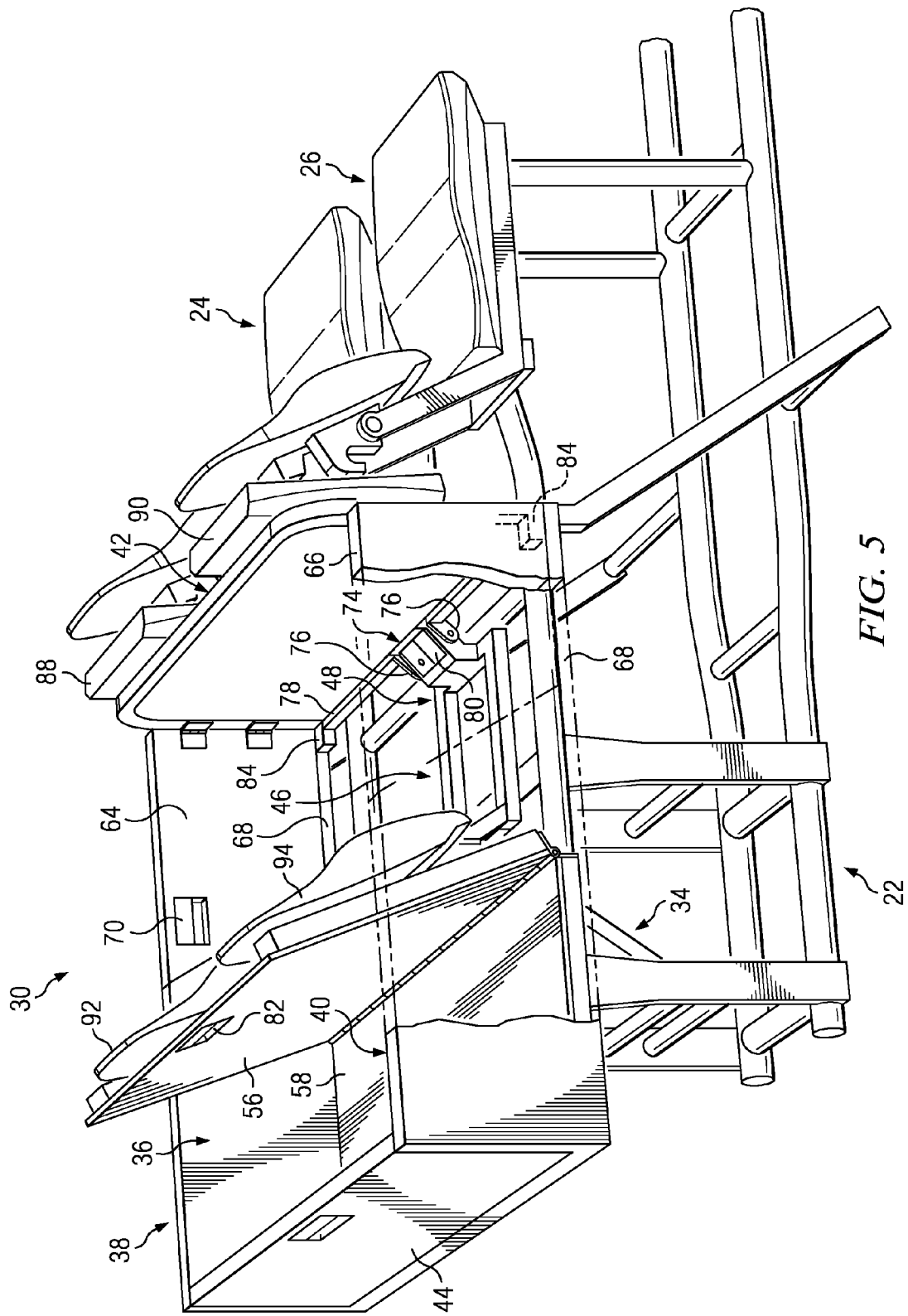
FIG. 5 is a right rear perspective view similar to FIG. 3 but with the front floor of the utility bed in an upright position.

In one embodiment, the utility bed 30 can include a bed frame 46 configured to provide underlying and structural support for certain components of the utility bed 30. As illustrated in FIG. 4, the bed frame 46 can comprise a tubular frame structure that extends along a length of the bed floor 36 (and additionally underneath the bed floor 36, as illustrated in FIGS. 4 and 5) and provides underlying support for the bed floor 36, the left and right side walls 38, 40, and/or the front wall 42. The bed frame 46 can include a front portion 48 and a rear portion 50. Pins 52 of the hinge assembly 32 can be attached to the rear portion 50 of the bed frame 46. The pins 52 can cooperate with corresponding brackets 54 of the hinge assembly 32 attached to the vehicular frame 22 to facilitate pivoting of the utility bed 30 relative to the vehicular frame 22. The bed frame 46 can be coupled with certain portions of the bed floor 36, such as through welded attachment. It will be appreciated that a bed frame can be provided in any of a variety of suitable alternative arrangements. For example, a bed frame might be integrally formed as part of a bed floor such as in a one-piece bed floor/bed frame configuration.

Figure 3:
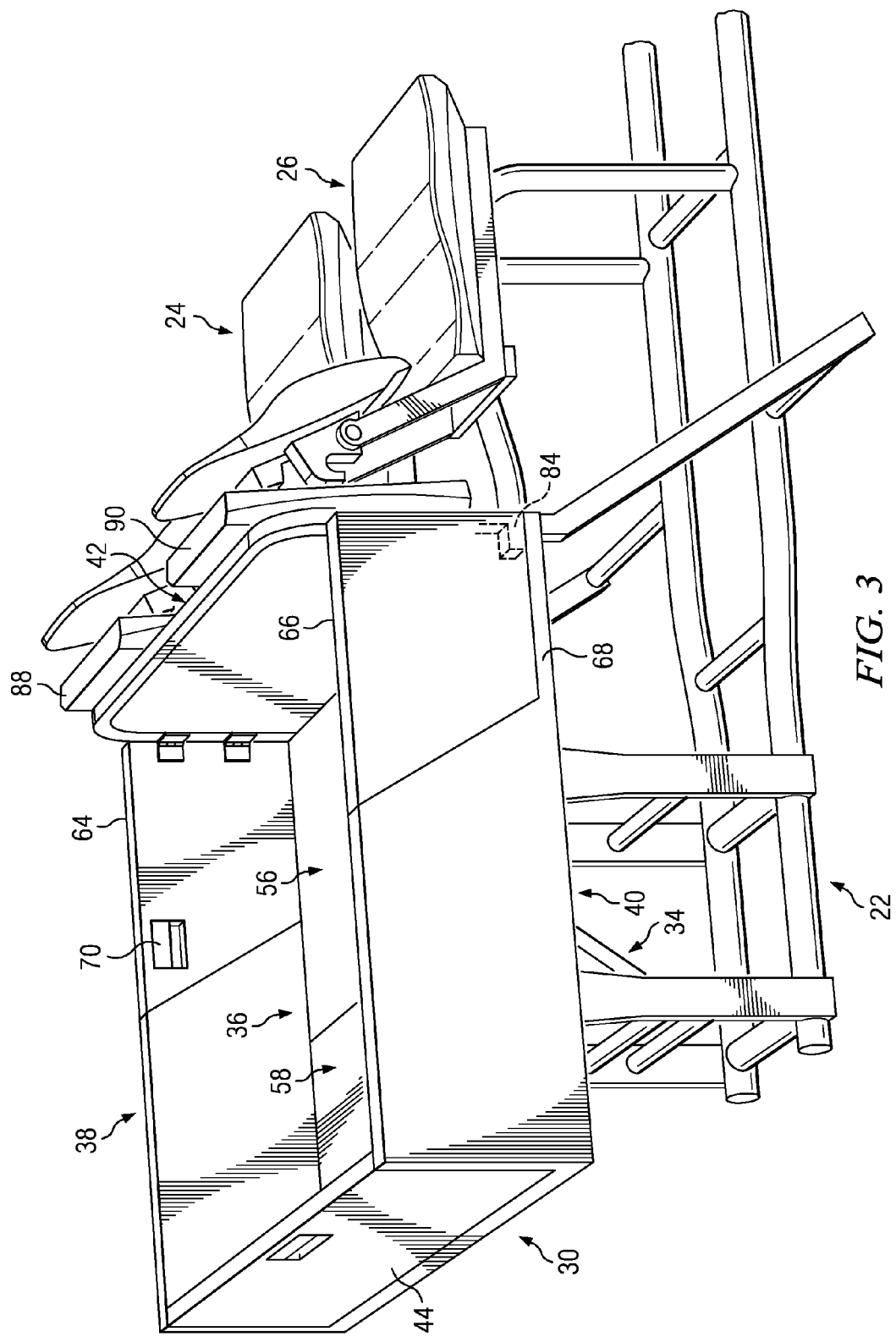
FIG. 3 is a right rear perspective view depicting the utility bed and other various components of the vehicle of FIG. 1, wherein the utility bed is shown in a hauling position with a front floor in a cargo support position, left and right doors in closed positions, and a front wall in an upright position.

The bed floor 36 is shown to comprise a front floor 56 and a rear floor 58. As illustrated in FIGS. 3 and 5, the front floor 56 can be pivotable with respect to the rear floor 58 between a cargo support position (FIG. 3) and an upright position (FIG. 5). The front floor 56 can define a front cargo support surface 60 and the rear floor 58 can define a rear cargo support surface 62. When the front floor 56 is in the cargo support position, the front cargo support surface 60 and the rear cargo support surface 62 can cooperate to define a substantially coplanar support surface that is configured to directly contact and provide underlying support for cargo (not shown) disposed within the utility bed 30. In an alternative embodiment, the bed floor 36 might not include a rear floor. It will be appreciated that first and second floor portions of a bed floor can be provided in any of a variety of suitable alternative arrangements.

The front floor 56 is shown to be pivotally attached to the rear floor 58 to facilitate pivoting of the front floor 56 between the cargo support position and the upright position. In other embodiments, it will be appreciated that a front floor can be movably coupled with a bed frame in any of a variety of suitable alternative arrangements. For example, a front floor can be pivotally attached directly to the bed frame 46.

In one embodiment, the rear floor 58 can be fixed with respect to the bed frame 46 such as through welded attachment. However, in other embodiments, the rear floor 58 can be pivotally or otherwise movably attached to the bed frame 46. For example, the rear floor 58 can be pivotally attached to the bed frame 46 to facilitate selective access to the area underlying the utility bed 30 (e.g., facilitating access to the hinge assembly 32).

It will be appreciated that any of a variety of known conventional mechanisms or methods (none shown) can be provided to facilitate manual or powered movement of the front floor 56 between the cargo support position and the upright position. For example, the front floor 56 can include a selectively concealable handle (not shown). In another embodiment, an electronic linear actuator can be coupled with each of the front floor 56 and the bed frame 46.

Figure 6:
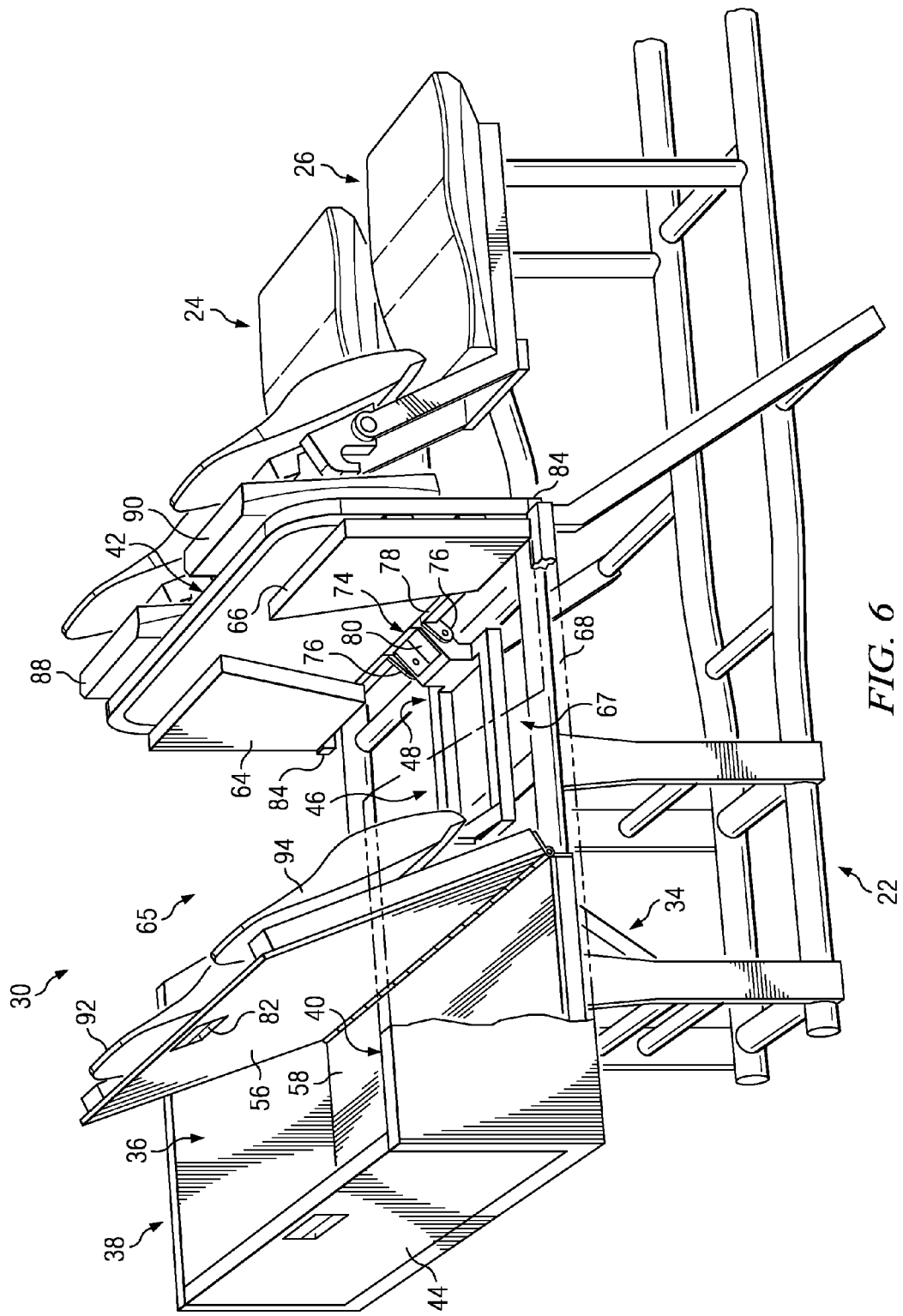
FIG. 6 is a right rear perspective view similar to FIG. 5 but with the left and right doors in opened positions.

The left and right side walls 38, 40 are shown to include respective left and right doors 64, 66 which are each pivotable between a closed position (FIG. 3) and an opened position (FIG. 6). When in the closed position, each of the left and right doors 64, 66 can cooperate with the bed floor 36, the front wall 42, and the remaining portions of the left and right side walls 38, 40 to retain cargo within the utility bed 30. When the left and right doors 64, 66 are moved to the opened position, left and right openings 65, 67 can be defined.

The left and right doors 64, 66 are shown to be pivotally attached to the front wall 42 such that, when the left and right doors 64, 66 are in the opened position, they can each lie substantially parallel with and against the front wall 42. In another embodiment, left and right doors can be pivotally attached to adjacent portions of respective left and right side walls. When the left door is in the opened position, it can lie substantially parallel with and against the left side wall. When the right door is in the opened position, it can lie substantially parallel with and against the right side wall.

The left and right side walls 38, 40 can be configured to ensure that the left and right doors 64, 66 can move to the opened position without being obstructed and while still maintaining proper aesthetics when the left and right doors 64, 66 are in their closed positions. As illustrated in FIGS. 3 and 5-6, the right side wall 40 can define a lower horizontally extending portion 68. When the right door 66 is in the closed position, the lower horizontally extending portion 68 can cooperate with the right door 66 to give the appearance of a substantially continuous right side wall 40. However, when the right door 66 is moved to the opened position, the lower horizontally extending portion 68 can remain in a fixed position thereby allowing the right door 66 to move to the opened position without being obstructed by the bed frame 46 and/or the bed floor 36. As illustrated in FIG. 2, the left side wall 38 and left door 64 can be provided in a similar configuration.

In one embodiment, a seal can be provided along the perimeter of each of the left and right doors 64, 66. Each seal can facilitate selective sealing of the interaction between the door (e.g., 64, 66) and the adjacent side wall (e.g., 38, 40). In another embodiment, the left and right door 64, 66 can each include a manually operated latching mechanism (e.g., 70, 72) that facilitates selective securing of the left and right doors 64, 66 in their closed positions. In yet another embodiment, an attachment assembly (not shown) can be provided that selectively maintains the left and right doors 64, 66 in the opened position. For example, in the embodiment of FIGS. 1-11, an attachment assembly can be provided that selectively maintains the left and right doors 64, 66 against the front wall 42.

Figure 7:
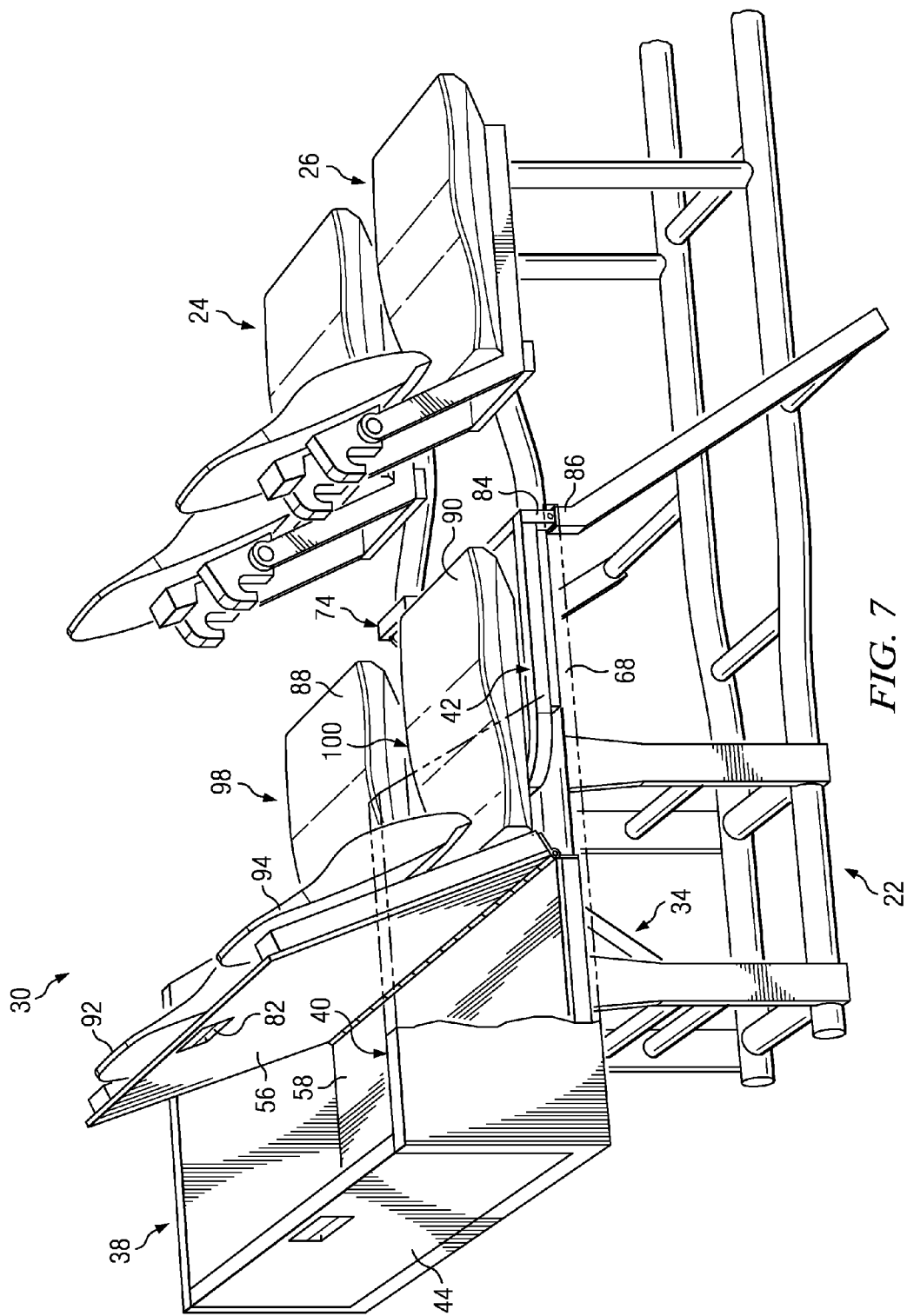
FIG. 7 is a right rear perspective view similar to FIG. 6 but with the front wall in a collapsed position.

As illustrated in FIGS. 5-7, the front wall 42 can be pivotable between an erected position (FIGS. 5 and 6) and a collapsed position (FIG. 7). When the front wall 42 is in the erected position, the front wall 42 and the left and right side walls 38, 40 can cooperate with the bed floor 36 to retain cargo within the utility bed 30.

In one embodiment, the front wall 42 can be pivotally attached to the bed frame 46 to facilitate pivoting of the front wall 42 between the erected position and the collapsed position. As illustrated in FIGS. 4-6, the bed frame 42 can include a neck portion 74 that extends from the front portion 48 of the bed frame 46. The front wall 42 can include a pair of hinge arms 76 that can be pivotally coupled with the neck portion 74. The hinge arms 76 can be pivotally attached to the neck portion 74 (e.g., with pins). In one embodiment, as illustrated in FIG. 1 the hinge arms 76 can be attached (e.g., through welding) to a bottom edge of the front wall 42 and to adjacent flange members 78 that are also attached to the bottom edge of the front wall 42. In such an arrangement, the neck portion 74 can rest upon the rest surface 35 (FIG. 2) provided by the rest structure 33 when the utility bed 30 is in the hauling position.

It will be appreciated that a front wall can be pivotally coupled or otherwise movably coupled with a bed frame in any of a variety of suitable alternative arrangements. For example, a front wall can be pivotally attached to the vehicular frame 22 such that pivoting the utility bed 30 to the dumping position does not correspondingly pivot the front wall. In another example, a front wall can be movably secured to a bed frame with tracks such that the front wall can slide with respect to the bed frame (e.g., between the erected and collapsed positions).

When the front wall 42 is in the erected position, as illustrated in FIGS. 5 and 6, the front wall 42 can rest upon an upper surface 79 (e.g., FIG. 4) of the neck portion 74. However, when the front wall 42 is in the collapsed position FIG. 7, the front wall 42 can lie adjacent to the neck portion 74 such that the neck portion 74 extends slightly above the front wall 42 (as illustrated in FIG. 7). As illustrated in FIGS. 5 and 6, when the front wall 42 is in the erected position, the flange members 78 of the front wall 42 can support the front floor 56 when the front floor 56 is in the cargo support position. The neck portion 74 can additionally define a receptacle 80. The receptacle 80 can selectively receive a portion of a latch 82 (shown in FIGS. 1, 5 and 6) that facilitates selective securement of the front floor 56 to the bed frame 46. Alternatively, the front floor 56 can be selectively secured to the bed frame 46 with any of a variety of other suitable releasable fasteners and/or mechanism(s).

The front wall 42 can be configured to ensure that movement between the erected and collapsed position is not obstructed by the left and right side walls 38, 40 (e.g., lower horizontal portions 68) while still maintaining proper aesthetics when the front wall 42 is in the collapsed position. As illustrated in FIGS. 5 and 6, the front wall 42 can include lower horizontally extending portions 84 disposed along lower ends of the front wall 42. The lower horizontally extending portions 84 of the front wall 42 can be provided alongside the lower horizontal extending portion 68 of the right side wall 40. When the front wall 42 is in the erected position, the lower horizontally extending portions 84 of the front wall 42 can be concealed by the lower horizontal extending portions 68 of the left and right side walls 38, 40. When the front wall 42 moves into the collapsed position, each lower horizontal extending portion 84 extends beneath the horizontal extending portions (e.g. 68) of the left and right side walls 38, 40 to engage a support member (e.g., 86) of the vehicular frame 22 to provide underlying support for the front wall 42.

A left seat bottom 88 and a right seat bottom 90 are shown to be coupled (e.g., either directly or indirectly) with the front wall 42. A left seat back 92 and a right seat back 94 are shown to be coupled (e.g., either directly or indirectly) with the front floor 56. Therefore, as illustrated, in FIGS. 3 and 5-7, the front floor 56, the left and right doors 64, 66, and the front wall 42 can each be selectively moved to convert the utility bed 30 into rear seats for the utility vehicle 20. For example, when the front floor 56 is in the cargo support position with the front wall 42 in the erected position, as shown in FIGS. 1-3, the left and right seat backs 92, 94 can be concealed beneath the utility bed 30 and the left and right seat bottoms 88, 90 can be stowed at a location that is behind the left and right front seats 24, 26. In such an arrangement, the front floor 56 and the rear floor 58 can cooperate to facilitate support of cargo by the utility bed 30. In one embodiment, as illustrated in FIG. 2, the bed frame 46 can include a cradle portion 96 that can selectively underlie the left and right seat backs 92, 94. In particular, when the front floor portion is in the cargo support position, the cradle portion 96 can protect the right and left seat backs 92, 94 such as from being contacted by debris during operation of the utility vehicle 20.

As illustrated in FIG. 5, the front floor 56 can be moved to the upright position to reveal the left seat back 92 and the right seat back 94. As illustrated in FIG. 6, with the front floor 56 in the upright position, each left and right door 64, 66 can be moved to their opened positions to define the respective left and right openings 65, 67. As illustrated in FIG. 7, once the left and right doors 64, 66 are moved to their opened positions, the front wall 42 can be pivoted to the collapsed position to move the left and right seat bottoms 88, 90 into a substantially horizontal position while concealing the left and right doors 64, 66 beneath the utility bed 30. In such an arrangement, the left and right seat backs 92, 94 can respectively cooperate with the left and right seat bottoms 64, 66 to define a left rear seat 98 and a right rear seat 100. Additionally, the left and right openings 65, 67 that are defined by opening the left and right doors 64, 66 can facilitate the ingress/egress of a passenger to/from the left and right rear seats 98, 100.

Figure 8:
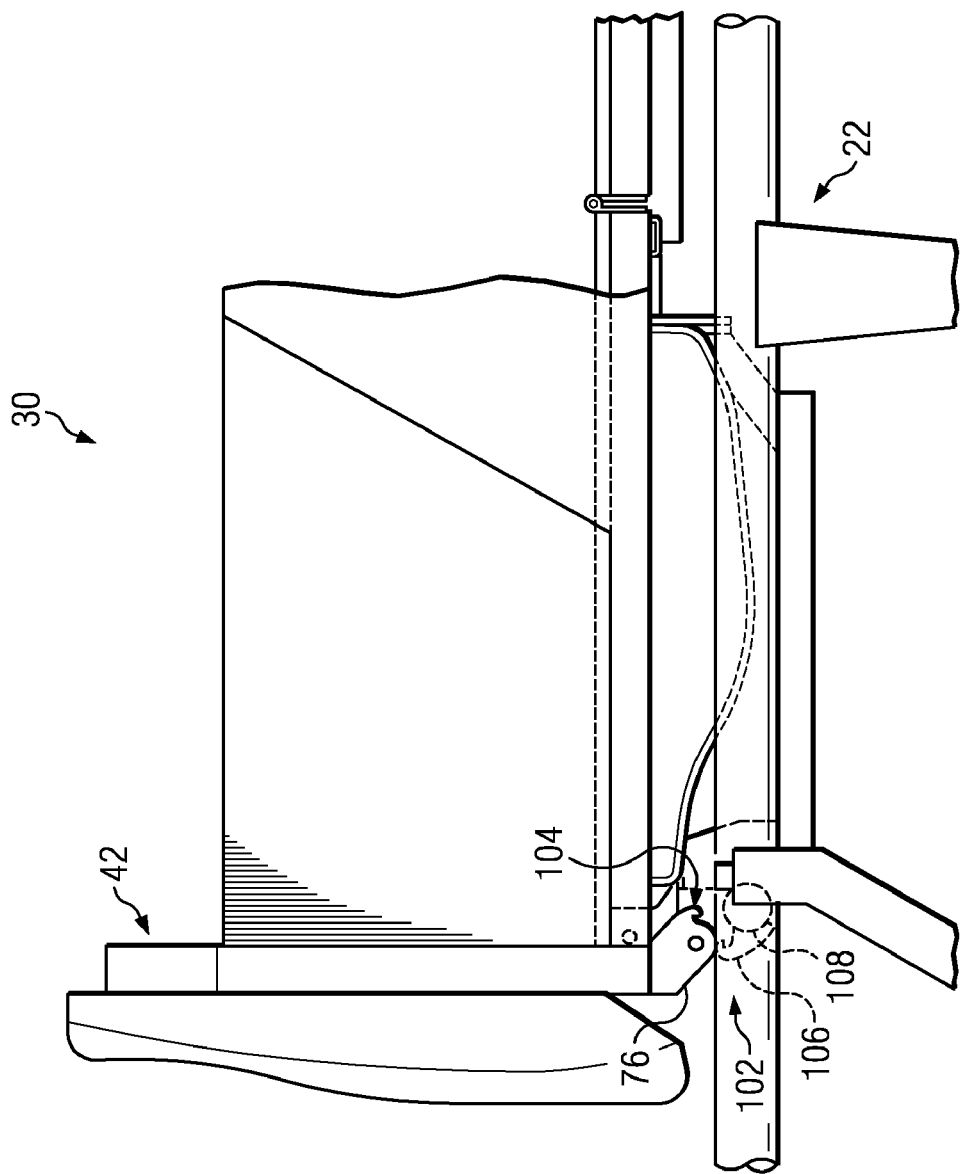
FIG. 8 is an enlarged left side elevational view of a locking device, according to one embodiment, depicting the utility bed, the front wall, and various other components of the vehicle of FIG. 1, wherein utility bed is in a hauling position and the locking device is in an unlocked position.
Figure 9:
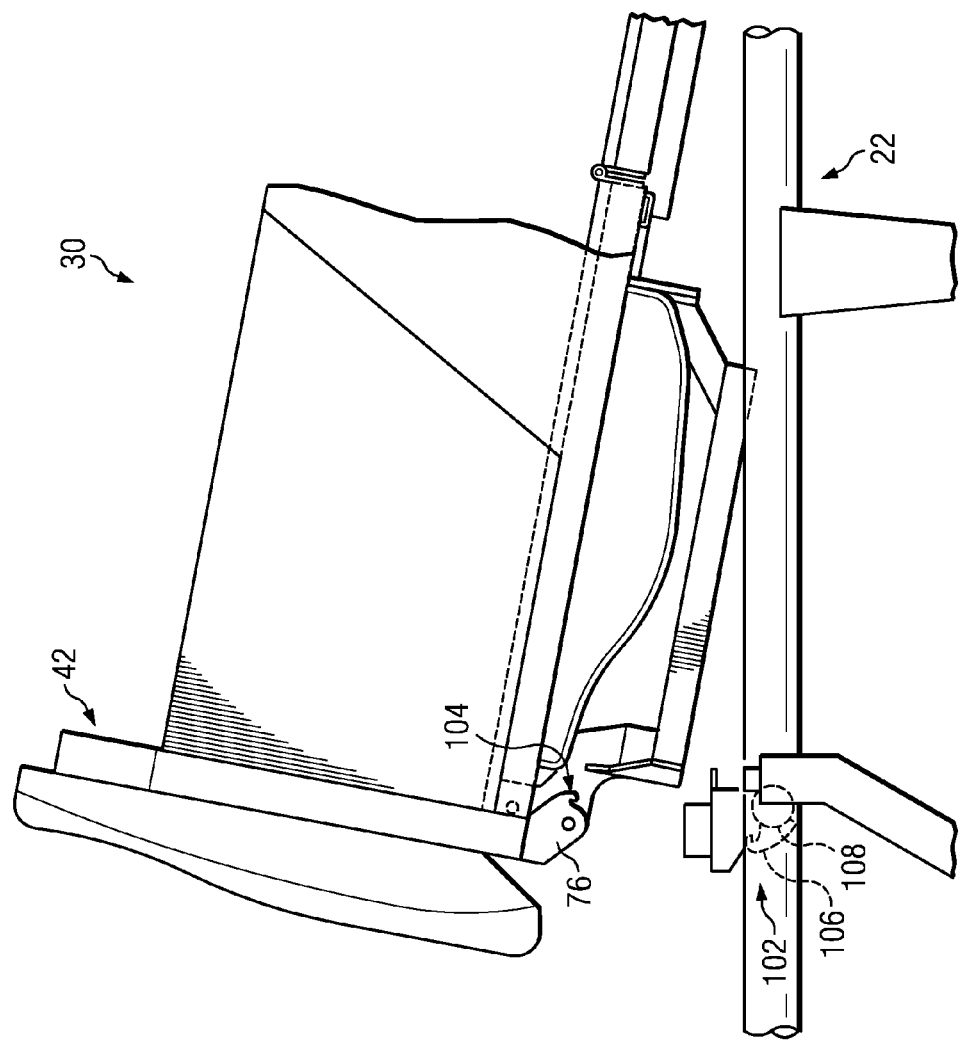
FIG. 9 is an enlarged left side elevational view of the utility bed of FIG. 8, but with the utility bed in a dumping position.
Figure 10:
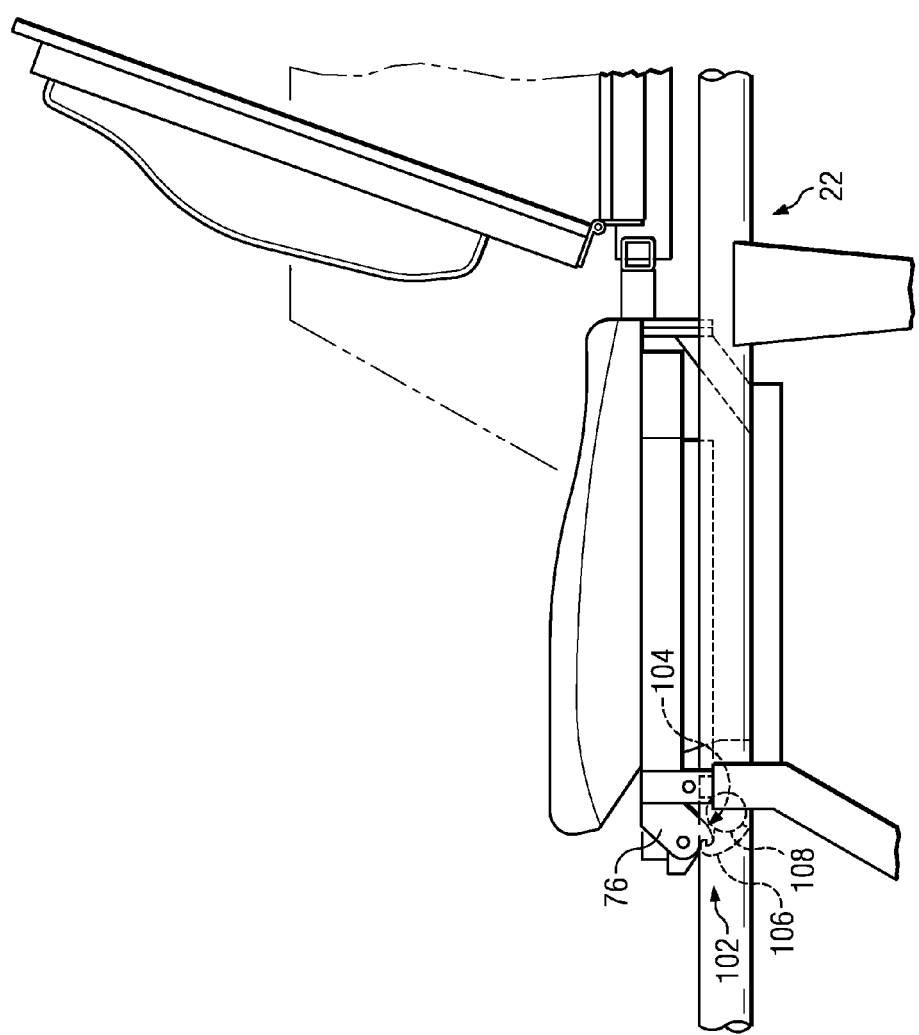
FIG. 10 is an enlarged left side elevational view of the utility bed of FIG. 8, but with the front wall in a collapsed position and the locking device in a locked position.
Figure 11:
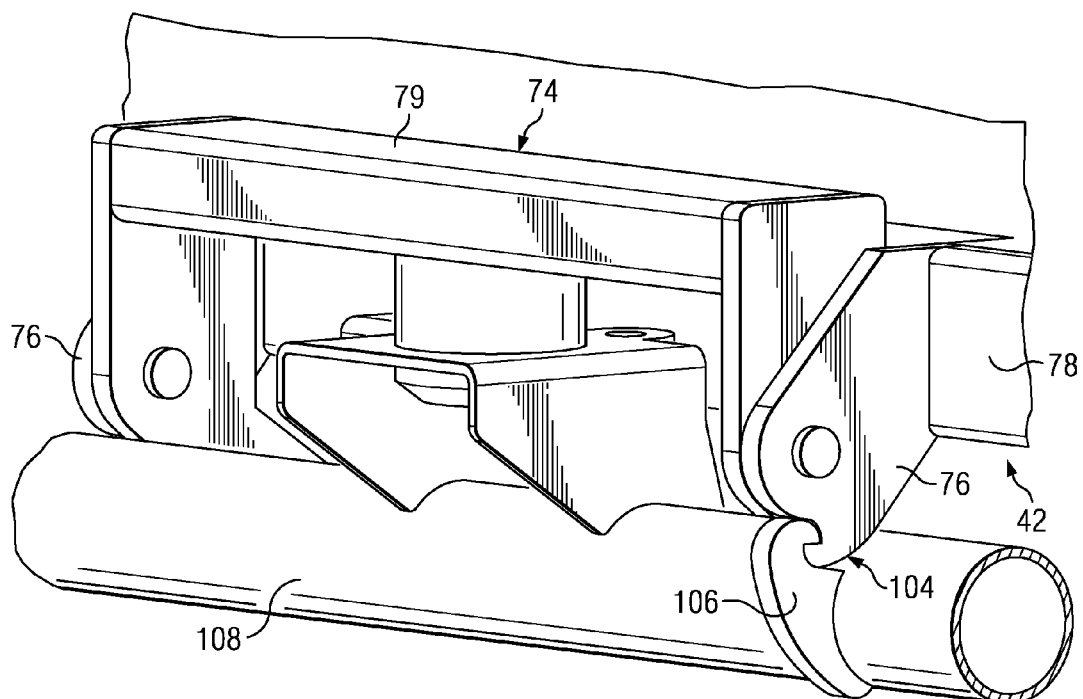
FIG. 11 is an enlarged front perspective view of the locking device of FIGS. 8-10.

The utility vehicle 20 can include a locking device 102, as illustrated in FIGS. 8-11, that can be coupled with at least one of the front wall 42 and the vehicular frame 22. The locking device 102 can be operable between a locked position and an unlocked position in response to movement of the front wall 42 between the erected position and the collapsed position. When the locking device 102 is in the locked position, the locking device 102 can be configured to prevent the utility bed 30 from pivoting to the dumping position. In one embodiment, as illustrated in FIGS. 8-11, the locking device 102 can include a first tab 104 and a second tab 106. The first tab 104 is shown to extend from one of the hinge arms 76 and the second tab 106 is shown to be coupled with a lateral support member 108 of the vehicular frame 22. When the front wall 42 is in the erected position, as illustrated in FIG. 8, the first and second tabs 104, 106 can remain disengaged from each other (e.g., the locking device 102 in an unlocked position) such that the utility bed 30 can be moved to the dumping position (as illustrated in FIG. 9). However, when the utility bed 30 is in the hauling position with the front wall 42 in the collapsed position, as illustrated in FIG. 10, the first and second tabs 104, 106 can interface with each other, as illustrated in FIG. 11 (e.g., the locking device 102 in a locked position), to prevent the utility bed 30 from pivoting to the dumping position. The locking device 102 therefore can prevent dumping of the utility bed 30 when the left and right rear seats 98, 100 are exposed thereby preventing undesired movement of the utility bed 30 for rear seated passengers.

Figure 12:
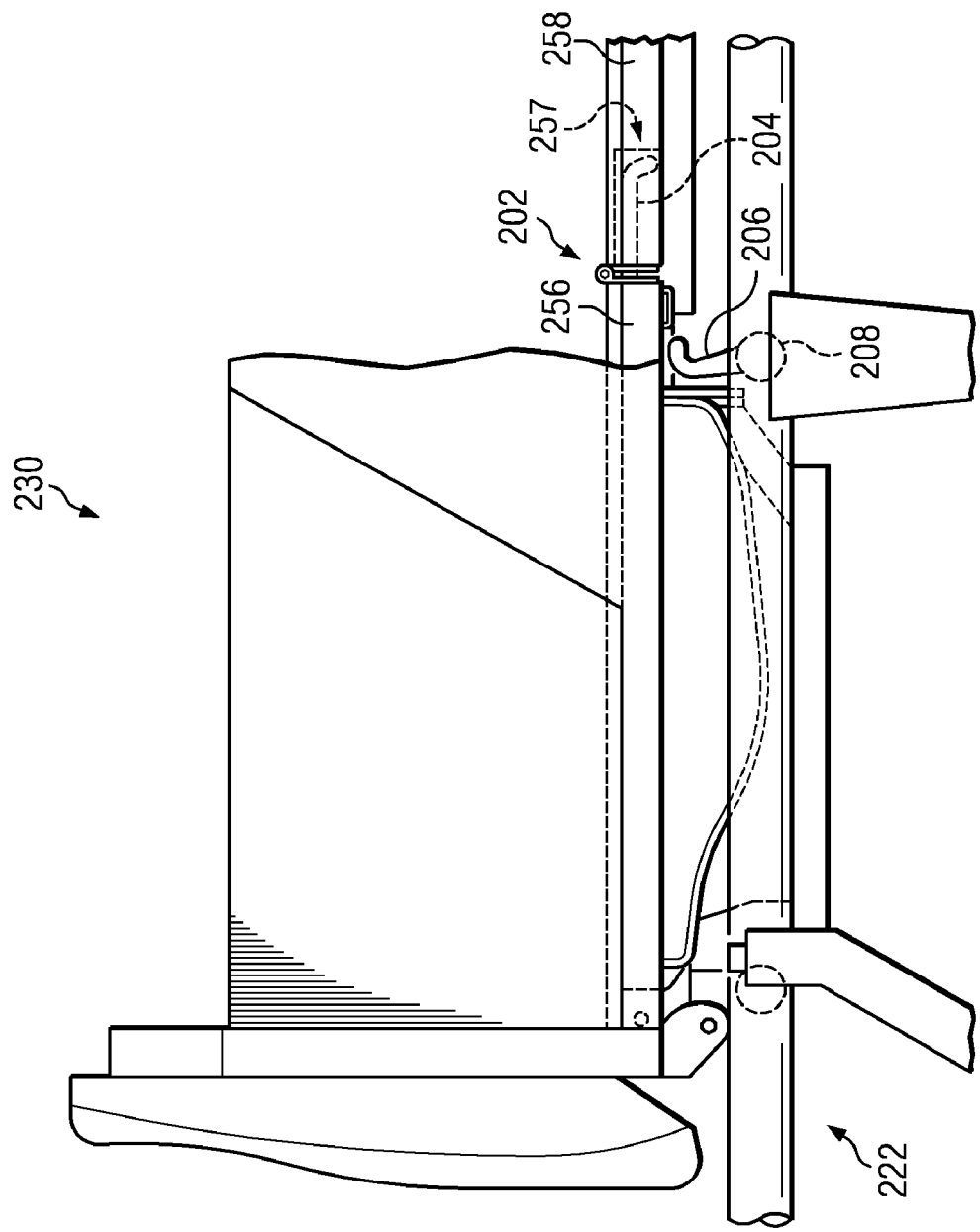
FIG. 12 is an enlarged left side elevational view of a locking device, according to another embodiment, depicting a utility bed, a front wall, and various other components of the vehicle of FIG. 1, wherein the utility bed is in a hauling position and the locking device is in an unlocked position.
Figure 13:
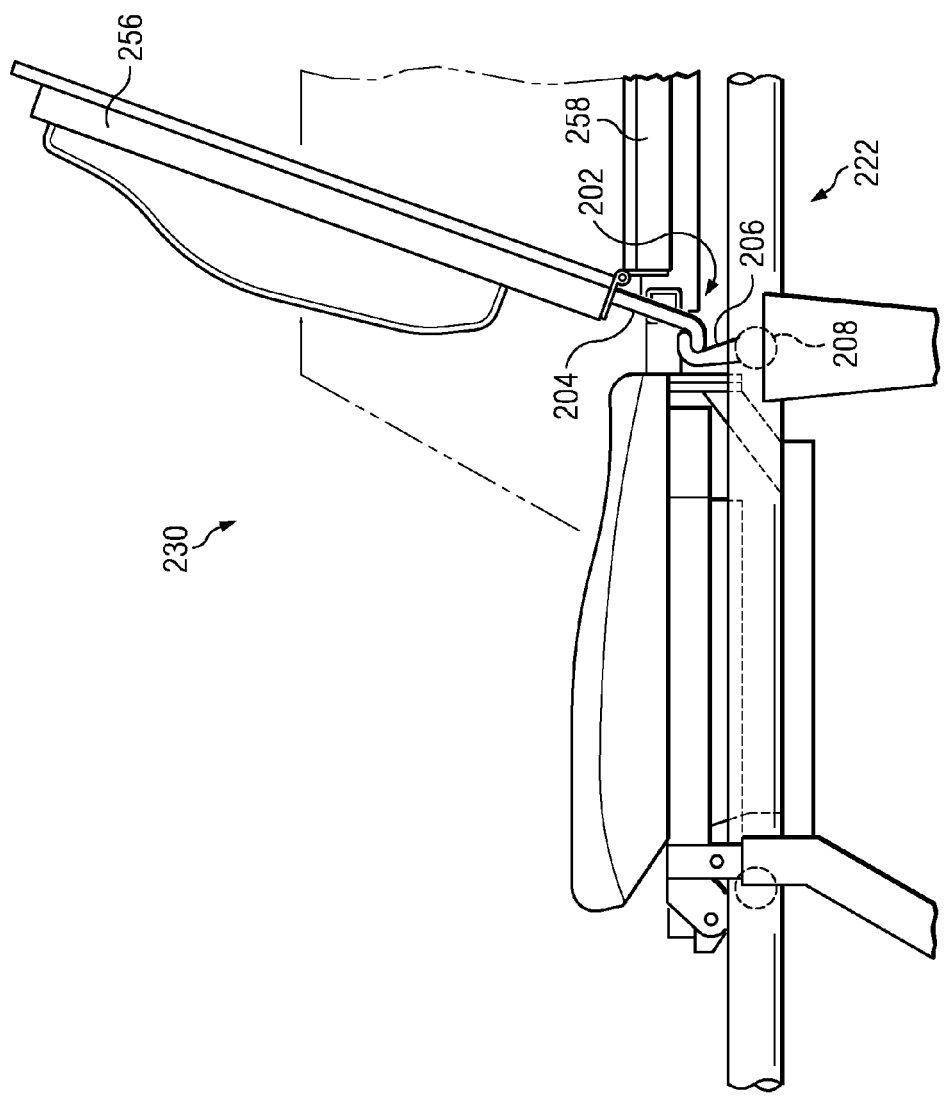
FIG. 13 is an enlarged left side elevational view of the utility bed of FIG. 12, but with the front wall in a collapsed position and the locking device in a locked position.

It will be appreciated however, that a locking device can prevent dumping of a utility bed in any of a variety of other suitable arrangements. For example, FIGS. 12 and 13 illustrate a locking device 202 according to another embodiment. The utility bed 230 illustrated in FIGS. 12 and 13 can be similar to, or the same in many respects to the utility bed 30 shown in FIGS. 2-11. For example, the utility bed 230 can include a front floor 256 that is pivotally coupled with a rear floor 258. The locking device 202 of utility bed 230, however, can include a first tab 204 that can extend from the front floor 256 and a second tab 206 that can be coupled with a lateral support member 208 of a vehicular frame 222. When the front floor 256 is in a cargo support position, as illustrated in FIG. 12, the first and second tabs 204, 206 remain disengaged from each other (e.g., the locking device 202 in an unlocked position) such that the utility bed 230 can be moved to the dumping position. As illustrated in FIG. 12, the rear floor 258 can define a recess 257 that is configured to receive the first tab 204 when the front floor 256 is in the cargo support position. However, when the utility bed 230 is in the hauling position with the front floor 256 in an upright position, as illustrated in FIG. 13, the first and second tabs 204, 206 can interface with each other (e.g., the locking device 202 in a locked position) to prevent the utility bed 230 from pivoting to the dumping position.

Figure 14:
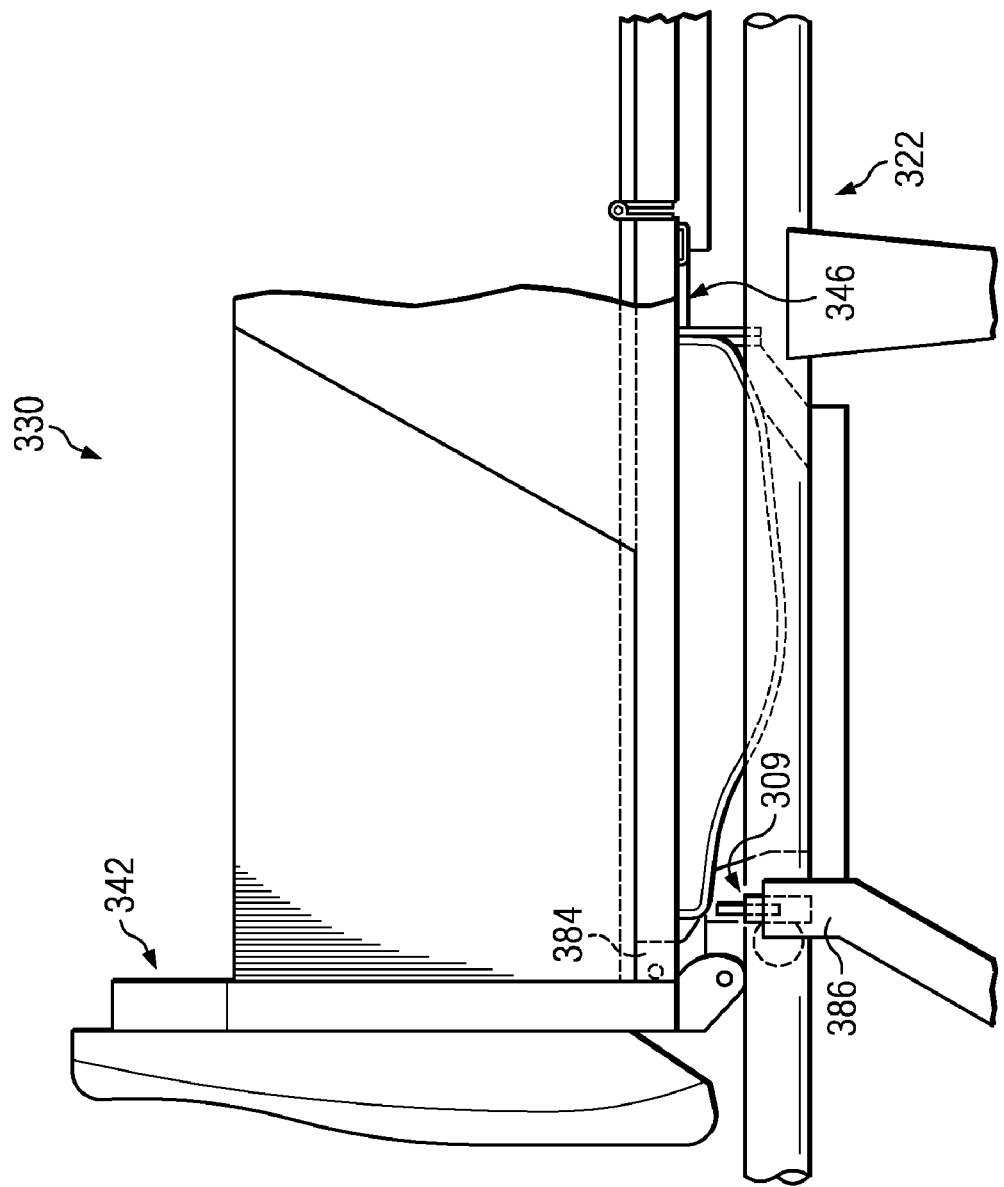
FIG. 14 is an enlarged left side elevational view of a cutoff switch, according to one embodiment, depicting a utility bed, a front wall, and various other components of the vehicle of FIG. 1, wherein the utility bed is in a hauling position and the cutoff switch is deactivated.
Figure 15:
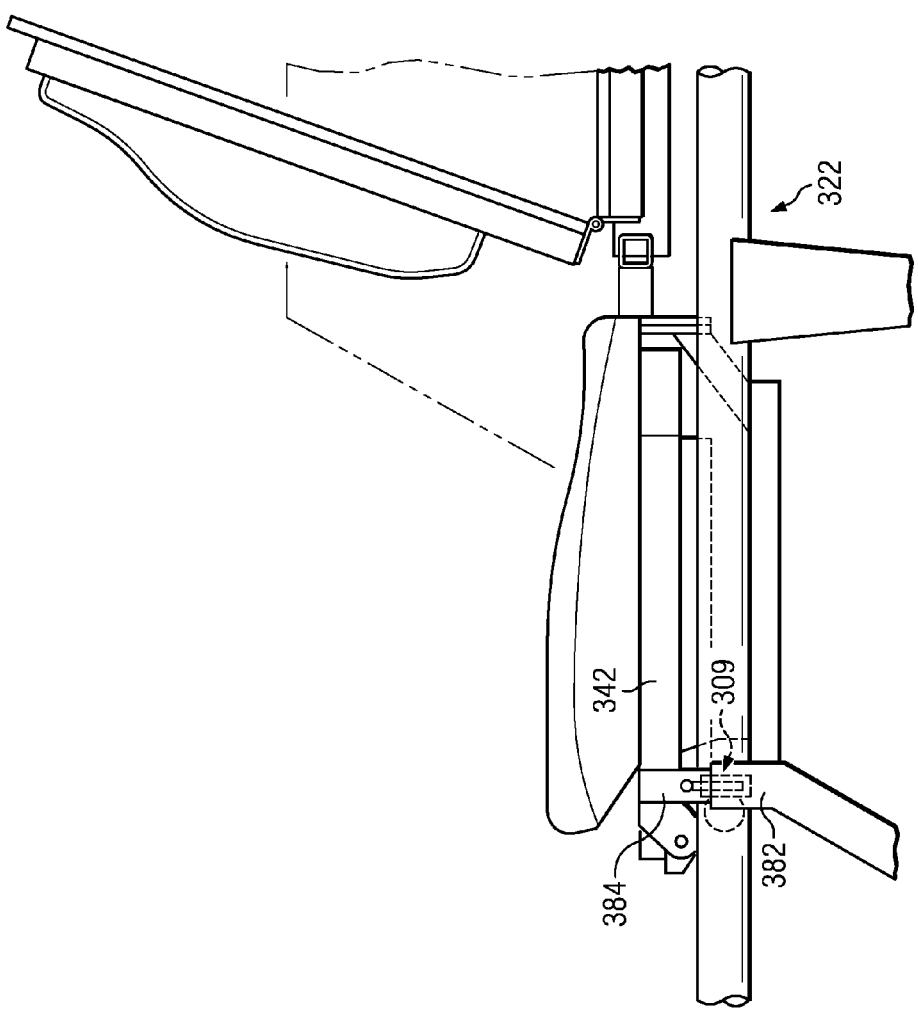
FIG. 15 is an enlarged left side elevational view of the utility bed of FIG. 14, but with the front wall in a collapsed position and the cutoff switch actuated.

FIGS. 14 and 15 illustrate a locking device according to another embodiment. The utility bed 330 illustrated in FIGS. 14 and 15 can be similar to, or the same in many respects to the utility bed 30 shown in FIGS. 2-11. For example, the utility bed 330 can include a front wall 342 that is pivotally coupled with bed frame 346. Movement of the utility bed 330 can be powered by an actuator (not shown) that can be coupled with the utility bed 330 and a vehicular frame 322. The front wall 342 can include a lower horizontally extending portion 384 that engages a support member 386 when the front wall 342 is in the collapsed position.

The locking device of utility bed 330, however, can include a cutoff switch 309, as illustrated in FIGS. 14 and 15. The cutoff switch 309 can be coupled with the support member 382 of the vehicular frame 322. When the front wall 342 is in the erected position, the cutoff switch 309 can remain deactivated (e.g., in an unlocked position). However, when the front wall 342 is moved to the collapsed position, the lower horizontally extending portion 384 can engage the support member 386 to actuate the cutoff switch 309 (e.g., the cutoff switch 309 is in a locked position). When actuated, the cutoff switch 309 can be configured to selectively disable operation of an actuator to prevent movement of the utility bed 330 to the dumping position. In one example, the actuator can be coupled with a controller (not shown) that facilitates operation of the utility bed 330 with a user-operated selector switch (not shown). The cutoff switch 309 can be coupled with the vehicular controller. When the cutoff switch 309 is depressed (e.g., by the horizontally extending lower member 382 of the front wall 342), the actuator and/or selector switch can be disabled by the controller.

Figure 16:
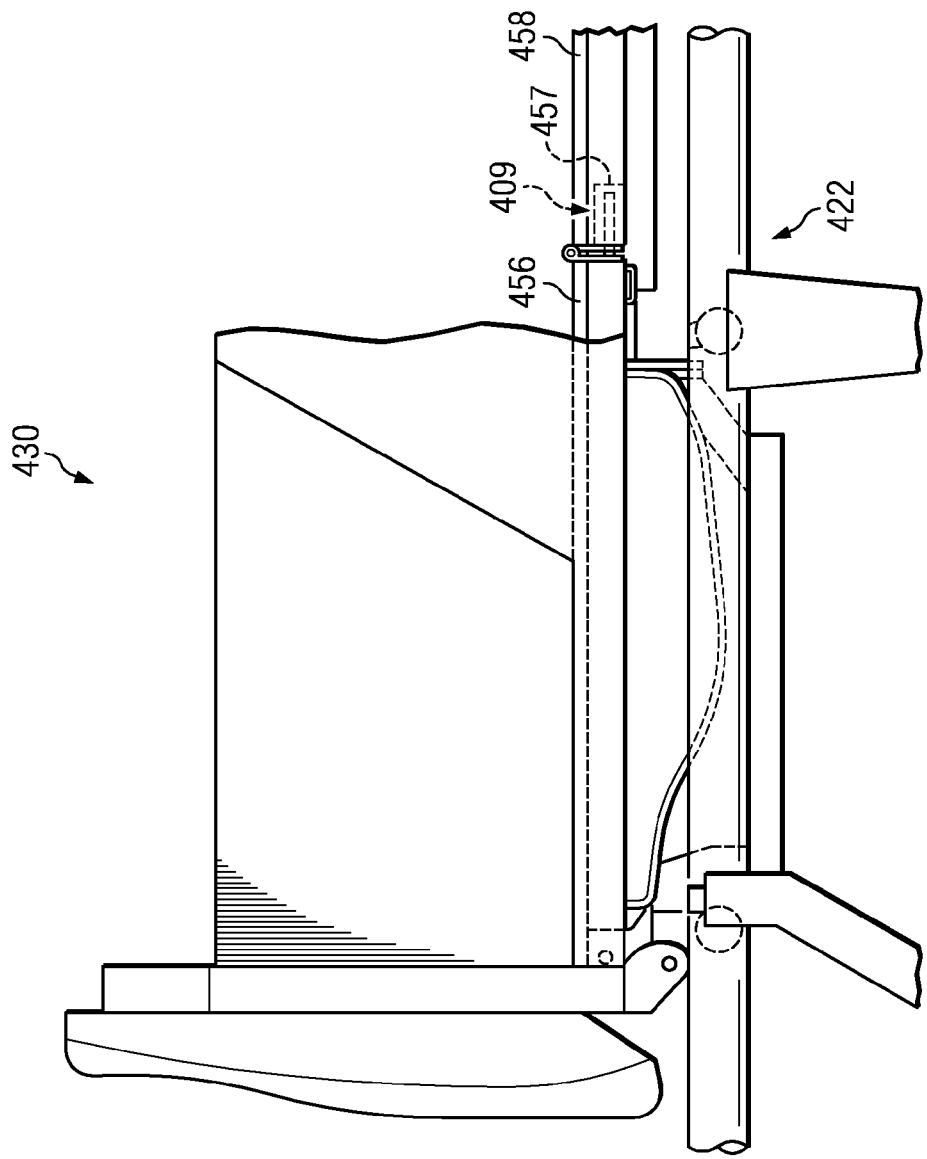
FIG. 16 is an enlarged left side elevational view of a cutoff switch, according to another embodiment, depicting a utility bed, a front wall, and other various components of the vehicle of FIG. 1, according to yet still another embodiment, wherein the utility bed is in a hauling position and the cutoff switch is actuated.
Figure 17:
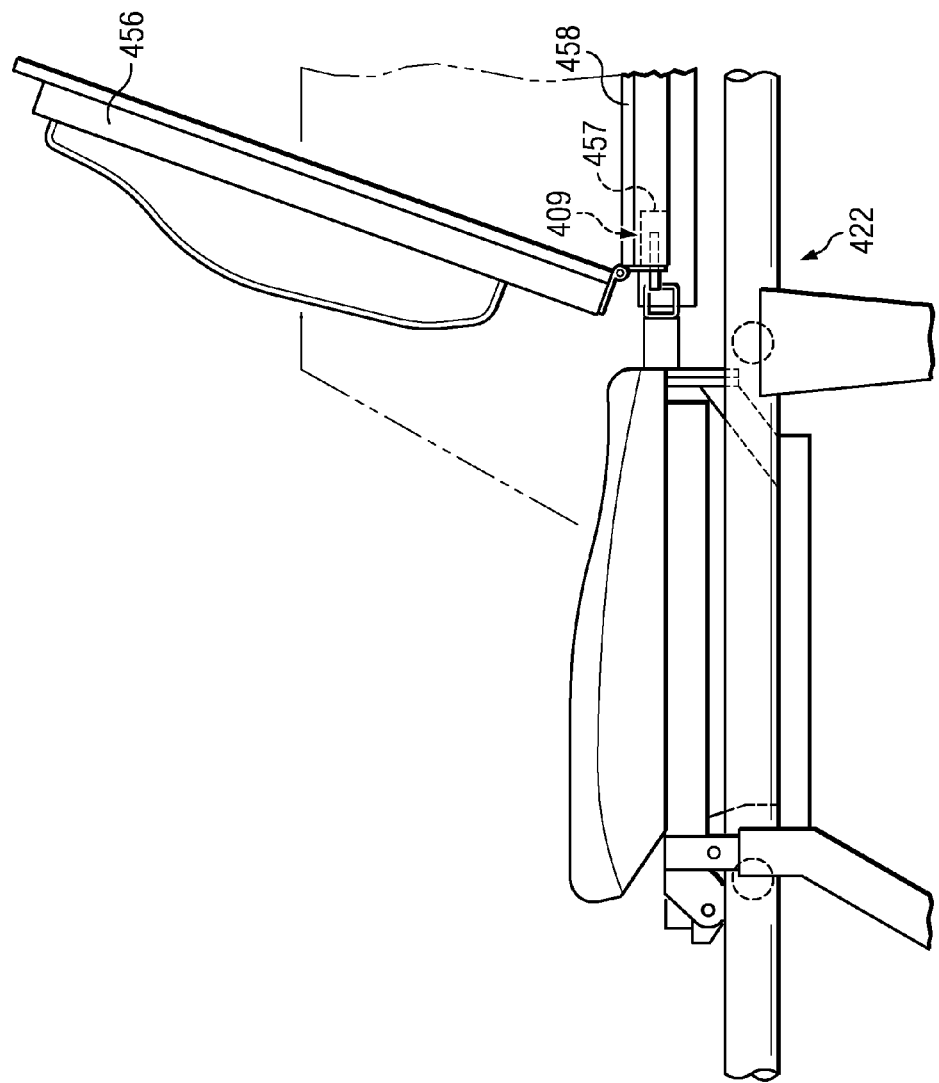
FIG. 17 is an enlarged left side elevation view of the utility bed of FIG. 16, but with the front wall in a collapsed position and the cutoff switch deactivated.

FIGS. 16 and 17 illustrate a locking device according to still another embodiment. The utility bed 430 illustrated in FIGS. 16 and 17 can be similar to, or the same in many respects to the utility bed 30 shown in FIGS. 2-11. For example, the utility bed 430 can include a front floor 456 that is pivotally coupled with a rear floor 458. The locking device of utility bed 430, however, can include a cutoff switch 409, as illustrated in FIGS. 16 and 17. As illustrated in FIGS. 16 and 17, the cutoff switch 409 is shown to extend into the rear floor 458. Therefore, the rear floor 458 can define a recess 457 that is configured to support the cutoff switch 409 adjacent to the front wall 456. When the front floor 456 is in the cargo support position, the cutoff switch 409 can be actuated (e.g., in an unlocked position). However, when the front floor 356 is moved to the upright position, the cutoff switch 409 can be deactivated (e.g., in a locked position). When deactivated, the cutoff switch 409 can be configured to disable operation of an actuator to prevent movement of the utility bed 430 to the dumping position. In one example, the actuator can be coupled with a controller (not shown) that facilitates operation of the utility bed 430 with a user-operated selector switch (not shown). The cutoff switch 409 can be coupled with the vehicular controller such that when the cutoff switch 409 is deactivated, the controller accordingly disables the actuator and/or selector switch. Although cutoff switches (e.g., 309 and 409) are illustrated in FIGS. 14-17 to include a plunger-type electrical switch, it will be appreciated that a cutoff switch can include any of a variety of electrical device configured to disable operation of a utility bed. It will further be appreciated that a cutoff switch can be alternatively or additionally coupled with a wall.

Although a locking assembly is described above to be associated with a front wall, it will be appreciated that a locking device can be associated with any of a variety of suitable alternative walls. For example, a locking device can be associated with a side wall (e.g., left or right side walls 38, 40) of a utility bed. When the side wall is moved to a collapsed position (e.g., to facilitate more efficient loading/unloading of cargo from one side of the utility bed 30), the locking device can prevent the utility bed from moving to the dumping position. In another example, a locking device can be associated with a rear wall (e.g., tailgate 44) of a utility bed. When the rear wall is in an upright position (e.g., to facilitate retention of cargo on the utility bed 30), the locking device can prevent the utility bed from moving to the dumping position (e.g., to avoid undesired dumping of cargo when the rear wall is upright).

While the relative movement of the front floor 56, the left and right doors 64, 66, and the front wall 42 is shown in FIGS. 1-7, to be sequential, a utility bed can alternatively be provided that allows the front floor 56, the left and right doors 64, 66, and/or the front wall 42 to be moved independent of one another. In one embodiment, the front floor 56, the left and right doors 64, 66, and/or the front wall 42 can be moved manually. In another embodiment, the front floor 54, the left and right doors 64, 66, and/or the front wall 42 can be moved automatically, such as by actuating a pushbutton. In such an embodiment, each of the front floor 56, the left and right doors 64, 66, and the front wall 42 can be moved with motorized actuators.

It will be appreciated, that although the embodiment of FIGS. 1-11 illustrates forward facing rear seats which are disposed towards a frontmost portion of the utility bed 30, rear seats can be provided on a utility bed in any of a variety of suitable alternative arrangements. In one embodiment, a rear floor of the utility bed can include left and right seat backs and can be pivotable between a cargo support position and an upright position. A rear wall of the utility bed can include left and right seat bottoms and can be pivotable between an erected position and a collapsed position. When the rear wall is pivoted to the collapsed position with the rear floor in the upright position the left and right seat backs respectively cooperate with the left and right seat bottoms to define rearwardly facing left and right rear seats. In such an embodiment, the left and right side walls may or may not include respective left and right side doors since the rear seats can be accessed from the rear of the utility vehicle.

It will also be appreciated, that although the end walls (e.g., front and rear walls) have been described as being pivotable, end walls can be movable in any of a variety of suitable alternative manners to selectively reveal a seat bottom. In one embodiment, a front wall can be removable from the utility bed to facilitate manual positioning of the front wall in the erected or collapsed position. It will also be appreciated that the floor portions, such as front and rear portions can also be otherwise movable.

Although the embodiments above have been described with respect to individual left and right rear scats, it will be appreciated that in other embodiments the utility bed can include more than two rear seats or less than two rear seats. In yet another embodiment, the utility bed can provide split rear scats. In such an embodiment, a front wall can be bifurcated into left and right portions. Each left and right portion can support a scat bottom. A front floor of the utility bed can be similarly bifurcated into left and right portions. Each left and right portion can support a seat back. In such an arrangement, left and right rear seats can be individually and selectively erected from the utility bed.

While various embodiments of a vehicle have been illustrated by the foregoing description and have been described in detail with respect to FIGS. 1-17, it is not intended to be exhaustive or to limit the scope of the appended claims to such detail. Numerous modifications are possible in light of the above teachings. Some of those modifications have been discussed and others will be understood by those skilled in the art.

What is claimed is:

1. A vehicle comprising:
   a vehicular frame;
   a utility bed pivotally coupled with the vehicular frame and pivotable between a hauling position and a dumping position, the utility bed comprising:
   a bed floor; and
   a wall movably coupled with the bed floor and movable between an erected position and a collapsed position;
   a locking device coupled with at least one of the wall and the vehicular frame, the locking device being operable between a locked position and an unlocked position in response to movement of the wall between the erected position and the collapsed position, wherein the locking device is configured to prevent the utility bed from pivoting to the dumping position when the locking device is in the locked position.

2. The vehicle of claim 1 wherein, when the locking device is in the locked position, the locking device is configured to couple the vehicular frame with the wall.

3. The vehicle of claim 2 wherein the locking device comprises a first tab and a second tab, the first tab is coupled with the wall, the second tab is coupled with the vehicular frame, and when the wall is in the collapsed position, the first tab and the second tab interface to prevent the utility bed from pivoting to the dumping position.

4. The vehicle of claim 1 further comprising an actuator coupled with at least one of the vehicular frame and the utility bed, the actuator being configured to facilitate movement of the utility bed between the hauling position and the dumping position.

5. The vehicle of claim 4 wherein the locking device comprises a cutoff switch that is configured to facilitate selective disablement of the actuator when the locking device is in the locked position.

6. The vehicle of claim 5 wherein the cutoff switch comprises a plunger-type electrical switch.

7. The vehicle of claim 1 wherein the wall is pivotally coupled with the bed floor.

8. The vehicle of claim 7 wherein the wall comprises at least one of a front wall, a right wall, and a left wall.

9. The vehicle of claim 1 wherein:
   the bed floor comprises a first floor portion that is pivotable between a cargo support position and an upright position;
   a seat back is coupled with the first floor portion;
   a seat bottom is coupled with the wall; and
   when the first floor portion is in the upright position with the wall in the collapsed position, the scat back and the seat bottom cooperate to provide a seat.

10. The vehicle of claim 9 wherein:
    the first floor portion comprises a front floor;
    the wall comprises a front wall; and
    the seat back and the seat bottom cooperate to provide a forward-facing rear seat.

11. The vehicle of claim 10 wherein the utility bed further comprises:
    a left side wall comprising a left door that is pivotable between an opened position and a closed position; and
    a right side wall comprising a right door that is pivotable between an opened position and a closed position.

12. The vehicle of claim 11 wherein:
the utility bed further comprises a second floor portion; and
the first floor portion is pivotally coupled with the second floor portion.

13. A vehicle comprising:
a vehicular frame;
a utility bed pivotally coupled with the vehicular frame and pivotable between a hauling position and a dumping position, the utility bed comprising a first floor portion that is pivotable between a cargo support position and an upright position;
a locking device coupled with at least one of the first floor portion and the vehicular frame, the locking device being operable between a locked position and an unlocked position in response to movement of the first floor portion between the cargo support position and the upright position, wherein the locking device is configured to prevent the utility bed from pivoting to the dumping position when the locking device is in the locked position.

14. The vehicle of claim 13 wherein, when the locking device is in the locked position, the locking device is configured to couple the vehicular frame with the first floor portion.

15. The vehicle of claim 14 wherein the locking device comprises a first tab and a second tab, the first tab is coupled with the first floor portion, the second tab is coupled with the vehicular frame, and when the first floor portion is in the upright position, the first tab and the second tab interface to prevent the utility bed from pivoting to the dumping position.

16. The vehicle of claim 13 further comprising an actuator coupled with at least one of the vehicular frame and the utility bed, the actuator being configured to facilitate movement of the utility bed between the hauling position and the dumping position, wherein the locking device comprises a cutoff switch that is configured to facilitate selective disablement of the actuator when the cutoff switch is in the locked position.

17. The vehicle of claim 13 wherein the utility bed further comprises a second floor portion and the first floor portion is pivotally coupled with the second floor portion.

18. A vehicle comprising:
a vehicular frame;
a utility bed pivotally coupled with the vehicular frame and pivotable between a hauling position and a dumping position, the utility bed comprising:
a bed floor; and
a wall movably coupled with the bed floor and movable between an erected position and a collapsed position;
means for preventing the utility bed from pivoting to the dumping position when the wall is in the collapsed position.

19. The vehicle of claim 18 wherein the means for preventing a utility bed from pivoting comprises a first tab and a second tab, wherein the first tab is coupled with the wall, the second tab is coupled with the vehicular frame, and when the wall is in the collapsed position, the first tab and the second tab interface to prevent the utility bed from pivoting to the dumping position.

20. The vehicle of claim 19 further comprising an actuator coupled with at least one of the vehicular frame and the utility bed, the actuator being configured to facilitate movement of the utility bed between the hauling position and the dumping position, wherein the means for preventing the utility bed from pivoting comprises a cutoff switch that is configured to facilitate selective disablement of the actuator.

\* \* \* \* \*

UNITED STATES PATENT AND TRADEMARK OFFICE
CERTIFICATE OF CORRECTION

PATENT NO. : 8,313,136 B2
APPLICATION NO. : 12/685877
DATED : November 20, 2012
INVENTOR(S) : Arnold et al.

It is certified that error appears in the above-identified patent and that said Letters Patent is hereby corrected as shown below:

Column 5, line 33, change "scaling" to --sealing--;
Column 5, line 60, change "FIG. 1" to --FIG. 11--;
Column 6, line 48, change "scat" to --seat--;
Column 6, line 53, change "scats" to --seats--;
Column 6, line 57, change "scat" to --seat--;
Column 9, line 55, change "scats" to --seats--;
Column 9, line 59, change "scats" to --seats--;
Column 9, line 61, change "scat" to --seat--; and
Column 10, line 55, change "scat" to --seat--.

Signed and Sealed this
Nineteenth Day of March, 2013

Teresa Stanek Rea
*Acting Director of the United States Patent and Trademark Office*